(12) United States Patent
Liu

(10) Patent No.: US 10,081,315 B2
(45) Date of Patent: Sep. 25, 2018

(54) POSITIONING DEVICE FOR FIXING VEHICLE REGISTRATION PLATE ON VEHICLE

(71) Applicant: Yao-Huang Liu, Tainan (TW)

(72) Inventor: Yao-Huang Liu, Tainan (TW)

( * ) Notice: Subject to any disclaimer, the term of this patent is extended or adjusted under 35 U.S.C. 154(b) by 0 days.

(21) Appl. No.: 15/436,929

(22) Filed: Feb. 20, 2017

(65) Prior Publication Data

US 2018/0236952 A1 Aug. 23, 2018

(51) Int. Cl.
*B60R 13/10* (2006.01)
*G09F 7/18* (2006.01)
*G09F 7/20* (2006.01)
*F16B 13/06* (2006.01)

(52) U.S. Cl.
CPC .......... *B60R 13/105* (2013.01); *F16B 13/066* (2013.01); *G09F 7/20* (2013.01); *G09F 2007/1895* (2013.01)

(58) Field of Classification Search
CPC ......... B60R 13/10; B60R 13/105; G09F 7/18; G09F 7/20; G09F 2007/1865; G09F 2007/1895; F16B 13/066
USPC ......... 40/200, 201, 202, 203, 209, 210, 211, 40/643, 910; 248/475.1, 488, 222.13, 248/222.14, 224.7; D12/193; 362/497; 411/60.1, 60.2, 546
See application file for complete search history.

(56) References Cited

U.S. PATENT DOCUMENTS

| | | | | |
|---|---|---|---|---|
| 1,913,773 A * | 6/1933 | Scaplen | ................ | B60R 13/105 40/209 |
| 5,702,216 A * | 12/1997 | Wu | ........................ | F16B 13/066 411/32 |
| 5,813,808 A * | 9/1998 | Wu | ........................ | F16B 13/068 411/24 |
| 7,357,613 B2 * | 4/2008 | Houck | ................ | F16B 13/0858 411/57.1 |
| 8,136,854 B2 * | 3/2012 | Rich | ..................... | B60R 13/105 293/1 |
| 8,657,543 B2 * | 2/2014 | Fabre | ........................ | F16B 5/02 411/44 |

(Continued)

FOREIGN PATENT DOCUMENTS

DE 10134960 A1 * 12/2002 .......... E04F 13/0837

*Primary Examiner* — Jonathan Liu
*Assistant Examiner* — Guang H Guan
(74) *Attorney, Agent, or Firm* — Alan D. Kamrath; Kamrath IP Lawfirm, P.A.

(57) ABSTRACT

A positioning device for fixing a vehicle registration plate in an affix hole of a vehicle contains: a connection member, at least one fitting sleeve, a flexible bushing, an operation sheath, and a screw rod. The connection member includes an arcuate section and two flat sections, and the arcuate section has an elongated orifice. Each of the at least one fitting sleeve includes a first through orifice, a first protrusion, and an indentation. The flexible bushing includes a peripheral rib, a second through orifice, multiple slits, and a second protrusion. The operation sheath includes a taper, multiple retaining ribs, and a threaded orifice. The screw rod inserts through the first through orifice of each fitting sleeve and the second through orifice of the flexible bushing to screw with the threaded orifice of the operation sheath, and positioned on the screw rod are a washer and a nut.

4 Claims, 5 Drawing Sheets

(56) References Cited

U.S. PATENT DOCUMENTS

| | | | | |
|---|---|---|---|---|
| 8,979,452 B2* | 3/2015 | Ikuno | ............ | F16B 31/021 |
| | | | | 411/5 |
| 9,053,646 B2* | 6/2015 | Bednarski | ............ | G09F 7/18 |
| 9,242,610 B2* | 1/2016 | DeGrazia | ............ | F16M 11/14 |
| 9,725,052 B1* | 8/2017 | Honaker | ............ | B60R 13/105 |
| D812,537 S* | 3/2018 | Chiang | ............ | F16B 13/068 |
| | | | | D12/193 |
| D813,131 S* | 3/2018 | Chiang | ............ | F16B 13/066 |
| | | | | D12/193 |
| 2015/0078861 A1* | 3/2015 | Heinz | ............ | G09F 7/18 |
| | | | | 411/368 |

* cited by examiner

POSITIONING DEVICE FOR FIXING VEHICLE REGISTRATION PLATE ON VEHICLE

BACKGROUND OF THE INVENTION

Field of the Invention

The present invention relates to a positioning device for fixing a vehicle registration plate on a vehicle and, more particularly, to the positioning device which is accommodated in an affix hole on a front end of the vehicle to avoid drilling another affix hole on the vehicle.

Description of the Prior Art

Typically, an affix hole is defined on a front end of a vehicle to screw with a hook of a trailer, such that the vehicle is delivered by the trailer by way of the affix hole and the hook. When the vehicle is not delivered by the trailer, it is covered by a cap. Furthermore, a vehicle registration plate is fixed on a central portion of a rear end or a front end of the vehicle. When desiring to fix the vehicle registration plate on other positions outside the central portion of the rear end or the front end of the vehicle, drilling another affix hole on the vehicle is required to fix the vehicle registration plate, thus increasing drilling cost and causing damage on the vehicle.

The present invention has arisen to mitigate and/or obviate the afore-described disadvantages.

SUMMARY OF THE INVENTION

The primary objective of the present invention is to provide a positioning device for fixing a vehicle registration plate on a vehicle which is accommodated in an affix hole on a front end of the vehicle to avoid drilling another affix hole on the vehicle.

To obtain the above-mentioned objectives, a positioning device for fixing a vehicle registration plate on a vehicle contains: a connection member, at least one fitting sleeve, a flexible bushing, an operation sheath, and a screw rod.

The connection member includes an arcuate section and two flat sections. The arcuate section has an elongated orifice. The two flat sections are formed on two ends of the connection member respectively and are connected with an inner surface of a mounting rack. An outer surface of the mounting rack contacts with the vehicle registration plate.

Each of the at least one fitting sleeve includes a first through orifice defined on a central position of each fitting sleeve, a first protrusion arranged on a front end of each fitting sleeve, and an indentation defined on a rear end of each fitting sleeve. The first protrusion retains in the elongated orifice of the connection member.

The flexible bushing includes a peripheral rib arranged around a front end of the flexible bushing, a second through orifice formed on a central position of the flexible bushing, multiple slits equidistantly defined on an outer wall of the flexible bushing behind the front end of the flexible bushing, and a second protrusion formed on the peripheral rib and corresponding to the indentation of each fitting sleeve.

The operation sheath includes a taper formed on a front end of the operation sheath, multiple retaining ribs arranged on an outer wall of the operation sheath and corresponding to the multiple slits of the flexible bushing, and a threaded orifice defined on a central position of the operation sheath.

The screw rod inserts through the first through orifice of each fitting sleeve and the second through orifice of the flexible sleeve to screw with the threaded orifice of the operation sheath. A washer and a nut are fixed on a front end of the screw rod.

The screw rod also includes a clamping face defined on the front end thereof ahead of the washer and the nut.

A length of each fitting sleeve is one of 60 mm, 50 mm and 40 mm.

An outer diameter of a rear end of the flexible bushing is less than an inner diameter of the affix hole.

DETAILED DESCRIPTION OF THE PREFERRED EMBODIMENTS

The present invention will be clearer from the following description when viewed together with the accompanying drawings, which show, for purpose of illustration only, preferred embodiments in accordance with the present invention.

Figure 1:
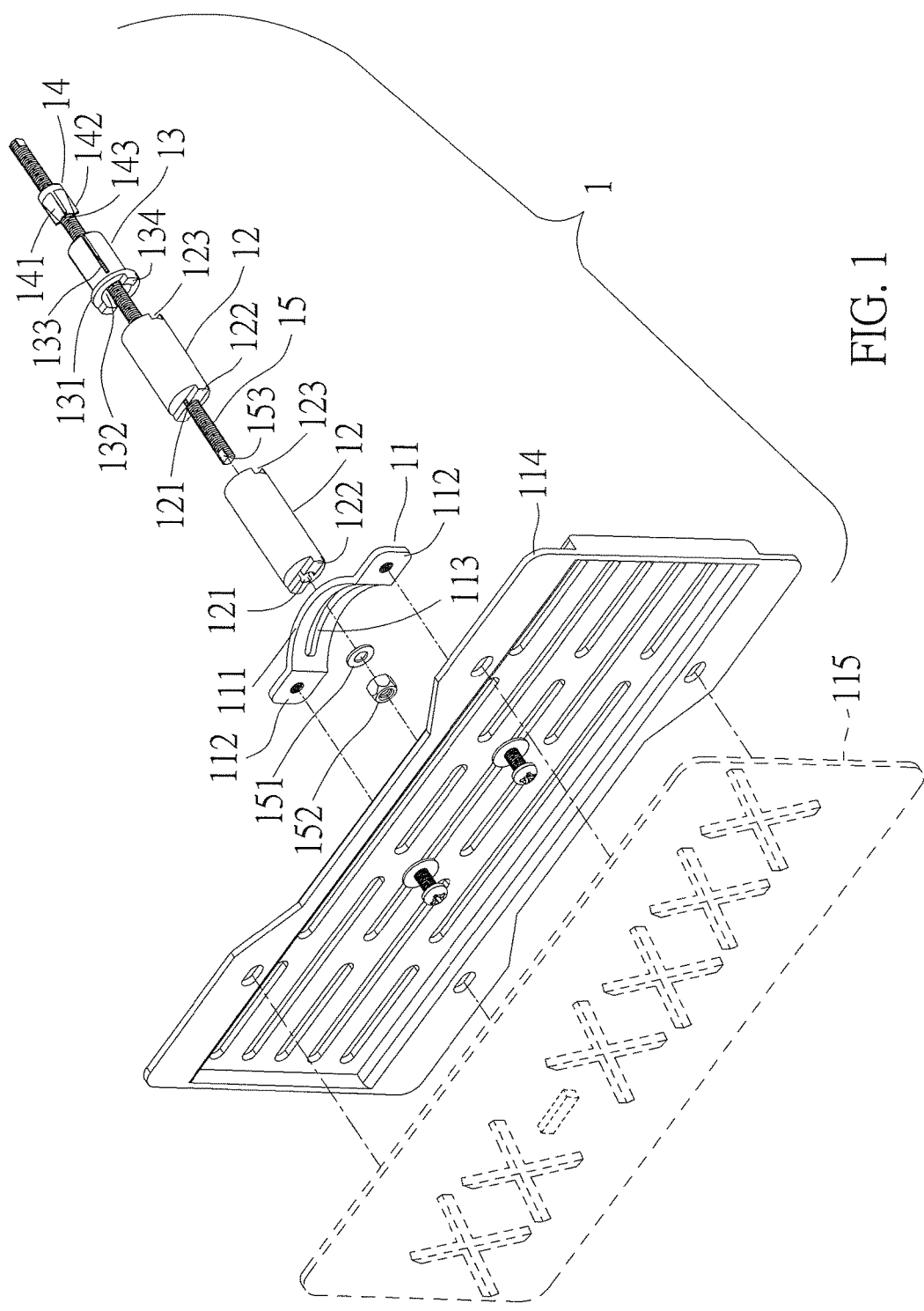
FIG. 1 is a perspective view showing the exploded components of a positioning device for fixing a vehicle registration plate on a vehicle according to a preferred embodiment of the present invention.
Figure 2:
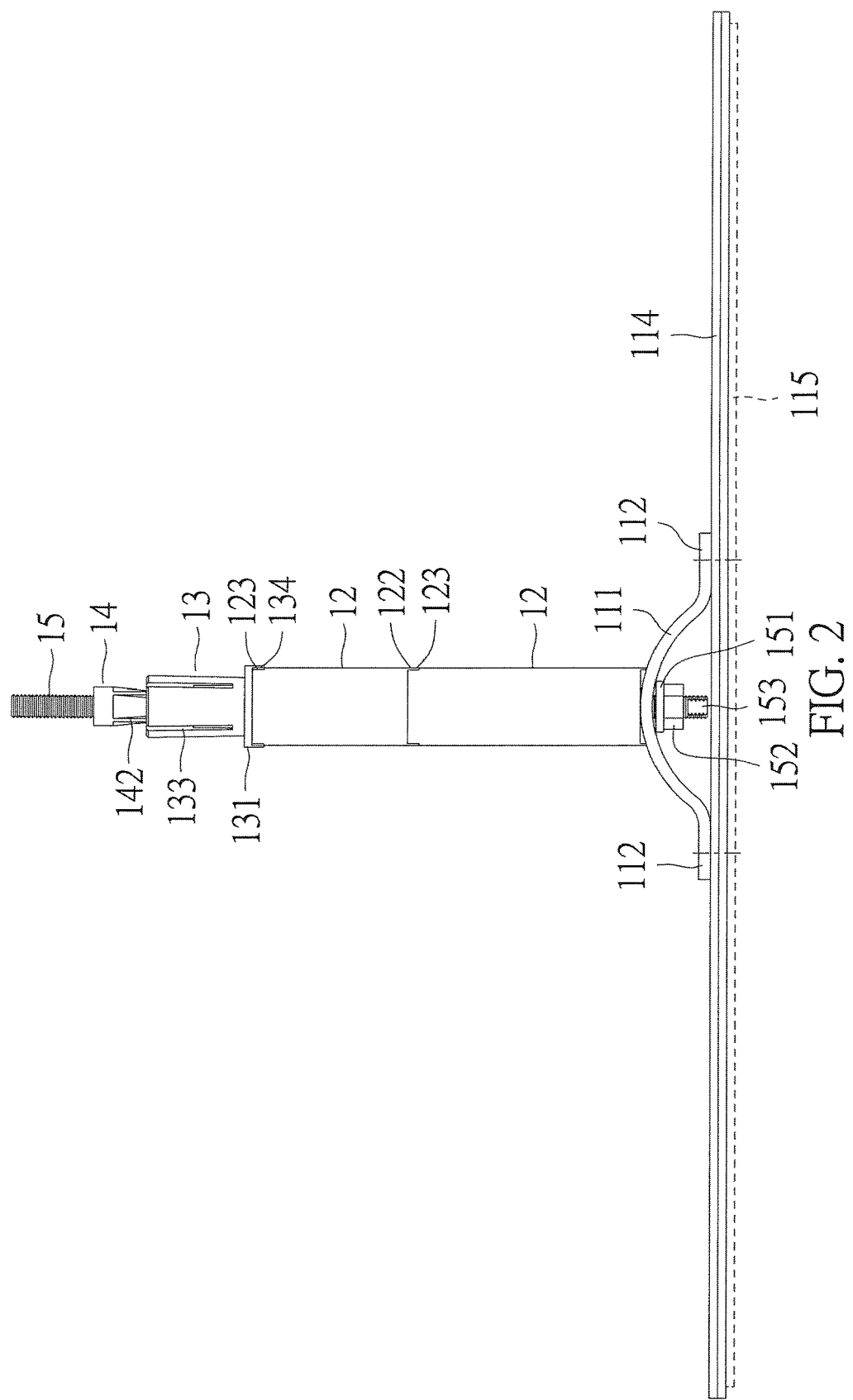
FIG. 2 is a top plan view showing the assembly of the positioning device for fixing the vehicle registration plate on the vehicle according to the preferred embodiment of the present invention.
Figure 3:
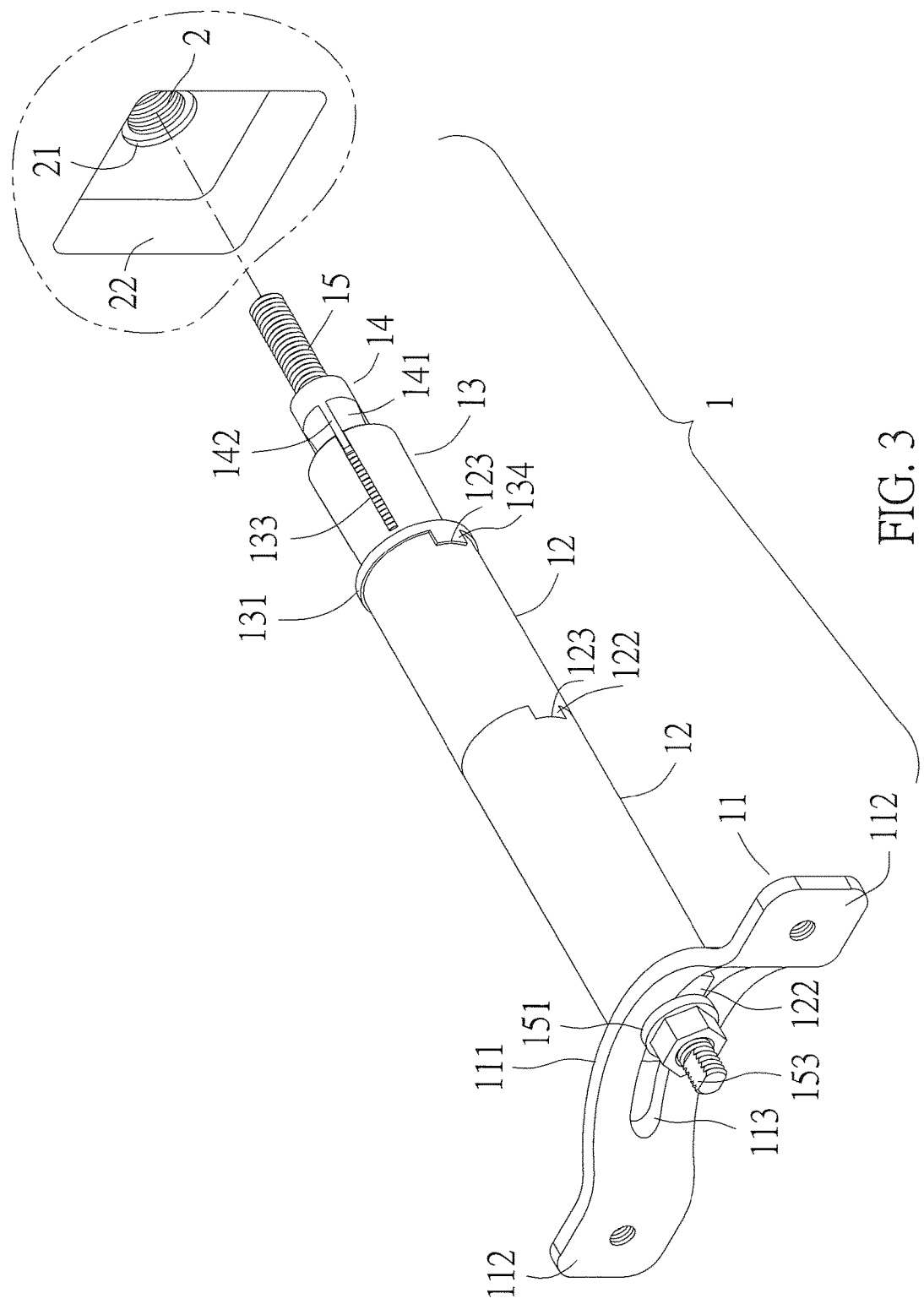
FIG. 3 is a perspective view showing the positioning device being accommodated in an affix hole of the vehicle according to the preferred embodiment of the present invention.

With reference to FIGS. 1 to 3, a positioning device 1 for fixing a vehicle registration plate on a vehicle according to a preferred embodiment of the present invention is accommodated in an affix hole 2 of the vehicle. The affix hole 2 is defined on a central portion of a front end or a rear end of the vehicle. The positioning device 1 comprises: a connection member 11, at least one fitting sleeve 12, a flexible bushing 13, an operation sheath 14, and a screw rod 15.

The connection member 11 includes an arcuate section 111 and two flat sections 112. The arcuate section 111 has an elongated orifice 113. The two flat sections 112 are formed on two ends of the connection member 11 respectively and are connected with an inner surface of a mounting rack 114. An outer surface of the mounting rack 114 contacts with the vehicle registration plate 115.

Each of the at least one fitting sleeve 12 includes a first through orifice 121 defined on a central position thereof, a first protrusion 122 arranged on a front end thereof, and an indentation 123 defined on a rear end thereof. The first protrusion 122 retains in the elongated orifice 113 of the connection member 11 (as shown in FIG. 3), and a length of each fitting sleeve 12 is one of 60 mm, 50 mm and 40 mm.

The flexible bushing 13 includes a peripheral rib 131 arranged around a front end thereof, a second through orifice 132 formed on a central position thereof, multiple slits 133 equidistantly defined on an outer wall of the flexible bushing 13 behind the front end of the flexible bushing 13, and a second protrusion 134 formed on the peripheral rib 131 and corresponding to the indentation 123 of each fitting sleeve 12. The second protrusion 134 retains in the indentation 123 of each fitting sleeve 12, and an outer diameter of a rear end of the flexible bushing 13 is less than an inner diameter of the affix hole 2.

The operation sheath 14 includes a taper 141 formed on a front end thereof, multiple retaining ribs 142 arranged on an outer wall of the operation sheath 14 and corresponding to the multiple slits 133 of the flexible bushing 13, and a threaded orifice 143 defined on a central position of the operation sheath 14.

The screw rod 15 inserts through the first through orifice 121 of each fitting sleeve 12 and the second through orifice 132 of the flexible bushing 13 to screw with the threaded orifice 143 of the operation sheath 14. A washer 151 and a nut 152 are fixed on a front end of the screw rod 15, and the screw rod 15 also includes a clamping face 153 defined on the front end thereof ahead of the washer 151 and the nut 152.

Figure 4:
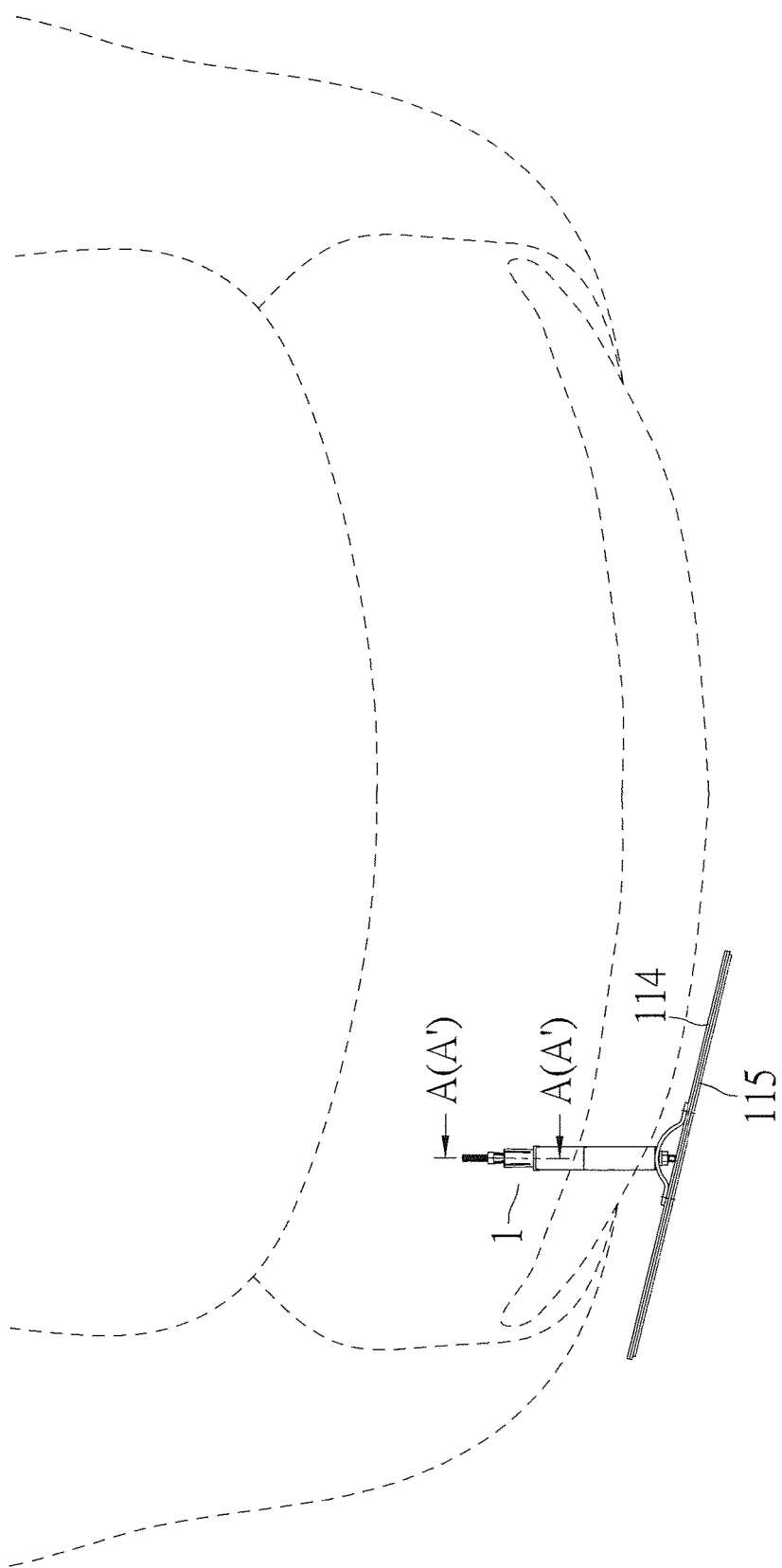
FIG. 4 is a schematic view showing the application of the positioning device for fixing the vehicle registration plate on the vehicle according to the preferred embodiment of the present invention.
Figure 5:
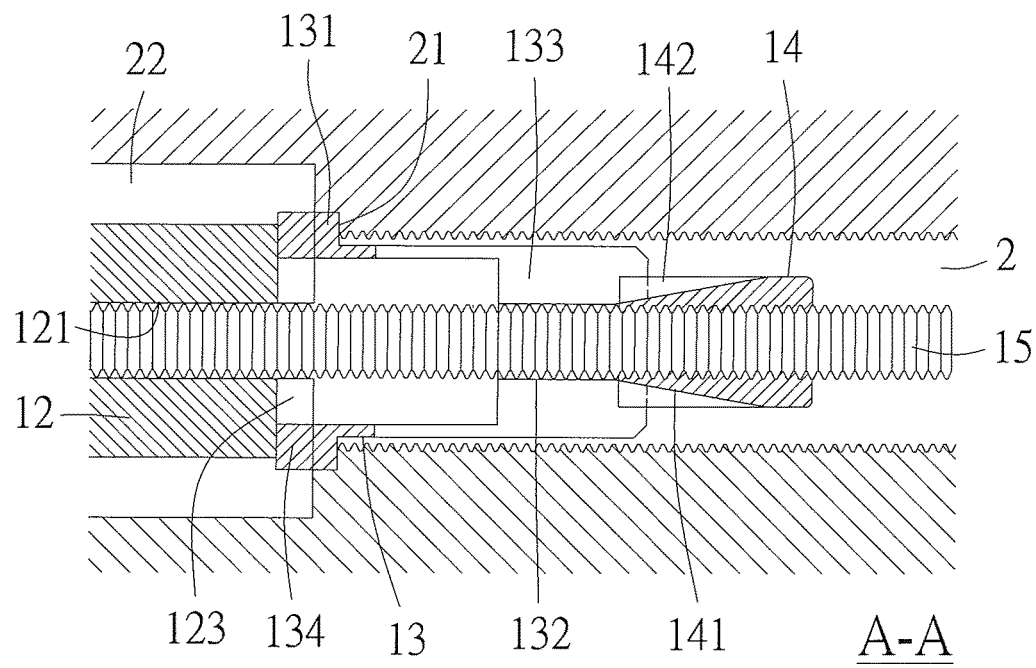
FIG. 5 is a cross sectional view taken along the line A-A of FIG. 4.
Figure 6:
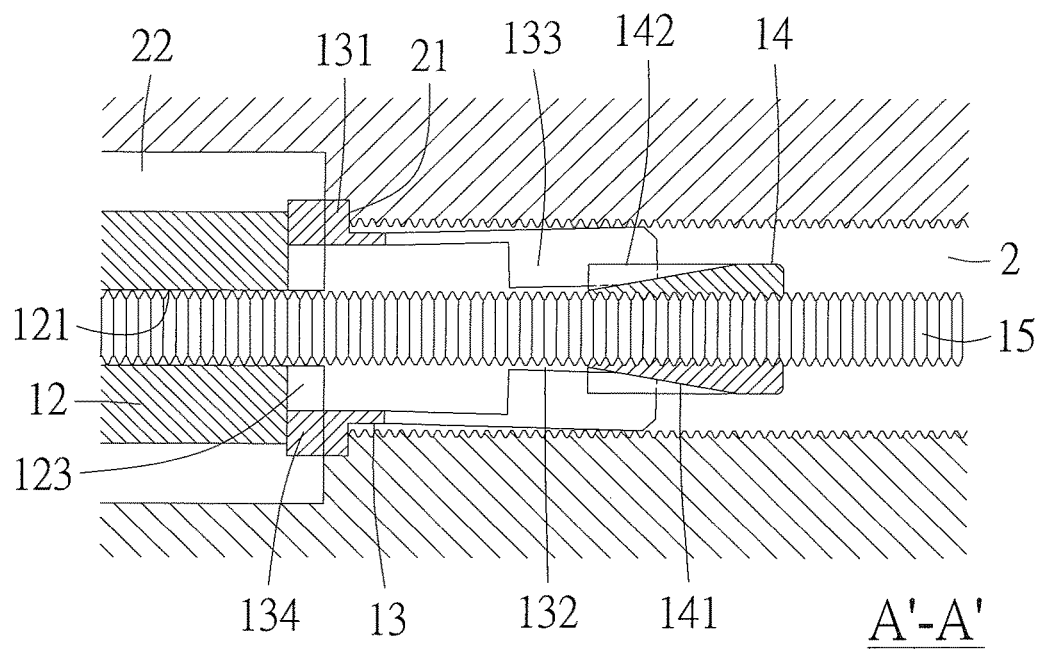
FIG. 6 is a cross sectional view taken along the line A'-A' of FIG. 4.

As illustrated in FIGS. 4-6, the operation sheath 14 of the positioning device 1 is moved forward to expand an outer wall of a rear end of the flexible bushing 13, and the operation sheath 14 is rotated clockwise along the screw rod 15. Referring further to FIG. 6, when the flexible bushing 13 matingly abuts against an inner wall of the affix hole 2 after being expanded, the positioning device 1 is fixed in the affix hole 2 on the rear end of the vehicle. In the meantime, the positioning device 1 retains in a locking groove 21 outside the affix hole 2 by using the peripheral rib 131 of the flexible bushing 13. Hence, the peripheral rib 131 and the locking groove 21 prevent the flexible bushing 13 moving into the affix hole 2.

With reference to FIG. 5, when the screw rod 15 of the positioning device 1 rotates counterclockwise to drive the operation sheath 14 to move rearward, the operation sheath 14 forces the rear end of the flexible bushing 13 to retract, such that the flexible bushing 13 recovers its size and removes from the affix hole 2, thus removing the positioning device 1 from the affix hole 2.

Referring to FIGS. 3, 5 and 6, an accommodation space 22 of different depths is arranged in front of the affix hole 2 and the locking groove 21. To apply for the accommodation space 22 of the different depths, the length of each fitting sleeve 12 of the positioning device 1 is one of 60 mm, 50 mm and 40 mm. When the accommodation space 22 of the positioning device 1 is shallow, the length of each fitting sleeve 12 is 40 mm, so that each fitting sleeve 12 is fixed between the connection member 11 and the flexible bushing 13. When the accommodation space 22 of the positioning device 1 is deep, one fitting sleeve 12 of 60 mm connects with the other fitting sleeve 12 of 40 mm or 50 mm, and the one fitting sleeve 12 and the other fitting sleeve 12 are fixed between the connection member 11 and the flexible bushing 13.

Thereby, the positioning device of the present invention has advantages as follows:

1. The positioning device 1 is fixed in the affix hole 2 to avoid drilling another affix hole on the vehicle. Hence, the vehicle registration plate 115 is secured on the front end of the vehicle, as illustrated in FIG. 4.

2. After the flexible bushing 13 expands in the inner wall of the affix hole 2, the positioning device 1 connects with the vehicle registration plate 115, such that the affix hole 2 accommodates the positioning device 1 and fixing the vehicle registration plate 115 on any desired position of the front end or the rear end of the vehicle.

3. The length of each fitting sleeve 12 of the positioning device 1 is one of 60 mm, 50 mm, and 40 mm, so that the at least one fitting sleeve 12 is applicable for the accommodation space 22 of different types and depths, and the positioning device 1 is applicable for vehicles of various types.

4. The screw rod 15 is rotated clockwise by way of the clamping face 153 to drive the operation sheath 14 to move forward, and the rear end of the flexible bushing 13 is expanded. When the screw rod 15 is rotated counterclockwise, it drives the operation sheath 14 to move rearward, and the rear end of the flexible bushing 13 is retracted to an original size. Hence, the screw rod 15 adjusts and changes the outer diameter of the rear end of the flexible bushing 13, and the positioning device 1 is fixed and is removed easily.

While various embodiments in accordance with the present invention have been shown and described, it is clear to those skilled in the art that further embodiments may be made without departing from the scope of the present invention.

What is claimed is:

1. A positioning device for fixing a vehicle registration plate on a vehicle, with the positioning device adapted to be accommodated in an affix hole on a front end or a rear end of the vehicle, with the positioning device comprising:
   a mounting rack having an inside surface and an outside surface;
   a connection member including an arcuate section and two flat sections, with the arcuate section having an elongated orifice, with the two flat sections formed on two ends of the connection member respectively and being connected with the inner surface of the mounting rack, and with the outer surface of the mounting rack adapted to contact with the vehicle registration plate;
   a front fitting sleeve and a rear fitting sleeve, each fitting sleeve including a first through orifice defined on a central position of each fitting sleeve, a first protrusion arranged on a front end of each fitting sleeve, and an indentation defined on a rear end of each fitting sleeve, with the first protrusion of the front fitting sleeve retaining in the elongated orifice of the connection member;
   a flexible bushing including a peripheral rib arranged around a front end of the flexible bushing, a second through orifice formed on a central position of the flexible bushing, multiple slits equidistantly defined on an outer wall of the flexible bushing behind the front end of the flexible bushing, and a second protrusion formed on the peripheral rib and corresponding to the indentation of the rear fitting sleeve;
   an operation sheath including a taper formed on a front end of the operation sheath, multiple retaining ribs arranged on an outer wall of the operation sheath and corresponding to the multiple slits of the flexible bushing, and a threaded orifice defined on a central position of the operation sheath;
   a screw rod inserting through the first through orifice of each fitting sleeve and the second through orifice of the flexible bushing to screw with the threaded orifice of the operation sheath; and
   a washer and a nut which are fixed on a front end of the screw rod.

2. The positioning device as claimed in claim 1, wherein the screw rod also includes a clamping face defined on the front end thereof ahead of the washer and the nut.

3. The positioning device as claimed in claim 1, wherein a length of each fitting sleeve is one of 60 mm, 50 mm and 40 mm.

4. The positioning device as claimed in claim 1, wherein the flexible bushing has a rear end with an outer diameter, and with the flexible bushing configured to be arranged in the affix hole with an inner diameter greater than the outer diameter of the rear end of the flexible bushing.

\* \* \* \* \*